(12) United States Patent
Sklebitz

(10) Patent No.: US 6,794,672 B2
(45) Date of Patent: Sep. 21, 2004

(54) SYSTEM FOR THE REGISTRATION OF RADIATION IMAGES

(75) Inventor: Hartmut Sklebitz, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 139 days.

(21) Appl. No.: 10/154,102

(22) Filed: May 23, 2002

(65) Prior Publication Data

US 2002/0190233 A1 Dec. 19, 2002

(30) Foreign Application Priority Data

May 23, 2001 (DE) .......................................... 101 25 528

(51) Int. Cl.[7] .............................................. G21K 4/00
(52) U.S. Cl. .................. 250/580; 250/214 VT
(58) Field of Search .................. 250/580, 214 VT, 250/214.1; 378/98.9, 98.8, 98.7

(56) References Cited

U.S. PATENT DOCUMENTS

| | | | |
|---|---|---|---|
| 5,195,118 A | 3/1993 | Nudelman et al. | |
| 5,515,411 A | 5/1996 | Tonami et al. | |

Primary Examiner—Albert Gagliardi
(74) Attorney, Agent, or Firm—Schiff Hardin LLP

(57) ABSTRACT

A system for the registration of radiation images has a radiation pick-up device and a control device controlling the operation thereof. The radiation pick-up device has a charge layer that generates electrical charges dependent on the incident radiation and an allocated electrode layer that is chargeable with high-voltage for triggering an electron-multiplying avalanche effect in the charge layer by virtue of a potential produced across the charge layer by the high-voltage. A read-out device reads out the generated charges in the charge layer by means of an electron beam. The potential via the charge layer can be modulated for varying the gain of the charge layer caused by the avalanche effect.

16 Claims, 2 Drawing Sheets

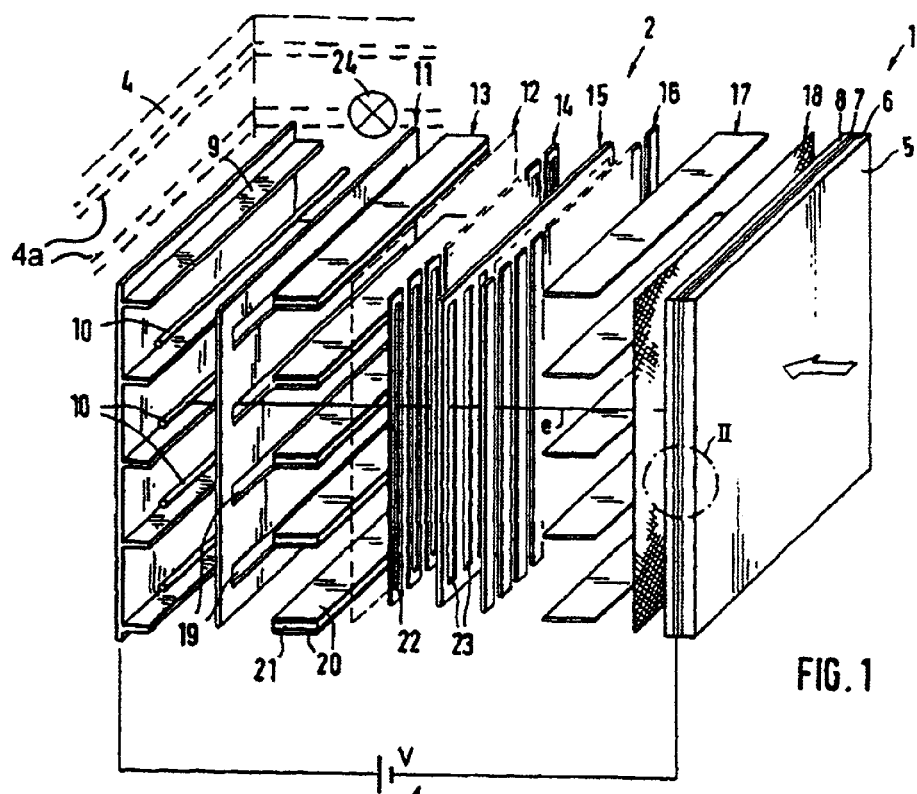
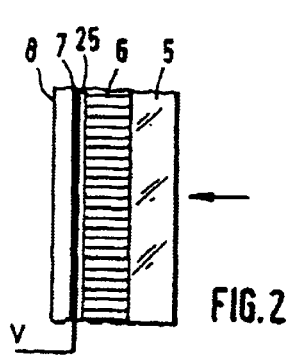
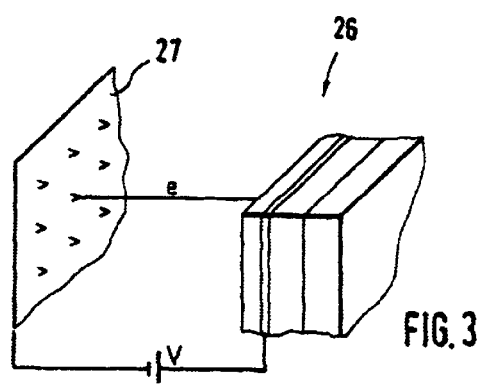

SYSTEM FOR THE REGISTRATION OF RADIATION IMAGES

BACKGROUND OF THE INVENTION

1. Field of the Invention

The present invention is directed to a system for the registration of radiation images of the type, having a radiation pick-up device and a control device that controls the operation thereof.

2. Description of the Prior Art

Systems of the above type for the registration of radiation images are utilized, for example in medical technology, for the registration of X-ray images. They can be employed in ordinary X-ray systems; however, employment in computed tomography is also possible.

The central element of such a system is the radiation pick-up device. Components referred to as a-Si-panels that have a scintillator layer, mainly of CsI, are for use in such a known device. The incident x-ray quanta are converted into visible light therein, and the light is processed by a following, amorphous semiconductor layer wherein a matrix of photodiodes is fashioned. This matrix is followed by dedicated read-out electronics. Dependent on the quantity of light arising from the conversion, charge, i.e. electrons, is generated in the photodiodes, which is read out via the dedicated read-out electronics. A problem associated with such radiation pick-up devices is the presence of non-variable light coupling between the scintillator and the photodiode matrix. This causes there to be hardly any possibilities for variation of the conversion efficiency (incident x-ray quanta to output voltage of the panel). This means that no variation of the conversion efficiency or of the gain can be achieved given different operating modes or different pick-up modes that operate with x-radiation having different doses. In medical technology, for example, modes for producing fluoroscopic or transillumination exposures, and digital radiography or digital subtraction angiography exposures, are often implemented in alternation.

The first-cited operating mode operates with a low x-ray dose with simultaneous pick-up of many images; the latter operating modes operate with x-rays of a high dose per individual image that is registered. Since no variation of the conversion efficiency is possible given known a-Si panels, these panels must be selected such that no over-modulation occurs given pick-up of images having a high radiation dose. This, however, causes an increase in electronic noise for fluoroscopic or transillumination exposures, particularly compared to known x-ray image intensifier video systems.

Alternatively to such a-Si panels, radiation pick-up devices are known that employ a layer referred to as a HARP layer (HARP—high gain avalanche rushing amorphous photoconductor). Such a HARP layer is composed of a charge layer that generates electrical charges dependent on the incident x-rays and an electrode layer allocated thereto that is chargeable with high-voltage for triggering an electron-multiplying avalanche effect in the charge layer via, causing a potential to arise in the high-voltage-condition. The read-out ensues using an electron beam that scans the HARP layer. Such a radiation pick-up device is known, for example, from German OS 44 10 269. In this radiation pick-up device, a high-voltage is connected between the electrode layer and the emitter cathode that generates the electron beam. This high-voltage causes high electrical fields to arise in the charge layer, which is preferably composed of amorphous silicon. The electrical fields ultimately produce an avalanche effect in the amorphous semiconductor charge layer. This multiplies the electrical charges exponentially for increasing the electrical potentials. Strong electrical fields are required in order to generate this avalanche effect, but such fields are able to be achieved in a relatively simple way by making the charge layer extremely thin. A considerable signal gain can in fact be achieved as a result; however, this known system is likewise a rigid system that does not allow any variation in gain.

SUMMARY OF THE INVENTION

An object of the present invention is to provide a system of the type initially described that allows the gain to be adapted to the image exposure mode which is to be implemented in a simple way.

This object is inventively achieved in a system is provided for the registration of radiation images, having a radiation pick-up device and a control device controlling the operation thereof, wherein the radiation pick-up device has: a charge layer that generates electrical charges dependent on the incident radiation and an allocated electrode layer chargeable with high-voltage for triggering an electron-multiplying avalanche effect in the charge layer by producing a potential across the charge layer, a read-out device for reading out the generated charges in the charge layer by means of an electron beam, and wherein the potential across the charge layer can be varied for varying the gain of the charge layer caused by the avalanche effect.

The invention is based on radiation pick-up device as disclosed, for example, by German OS 44 10 269. For solving the aforementioned problem, the invention proceeds from the perception that a variable gain for the signals that are generated on the basis of the incident x-radiation can be achieved by varying the potential across the charge layer. By varying the voltage via the charge or HARP layer, the local gain due to the avalanche effect can be varied. The avalanche effect, i.e., its intensity, is dependent on how large the potential is between the free surface of the charge layer and the coupled electrode layer. The avalanche effect is more pronounced the higher the potential is and vice versa.

This allows that the inventive system to adapt the gain of the radiation pick-up device to the currently selected image exposure mode in a simple way. When, for example, it is necessary to register transillumination images with a low x-ray dose and radiography images with a high radiation dose, then the gain can be switched between the two different operating modes by a corresponding variation of the layer potential. Given image registrations with low radiation dose, a high gain is selected; a lower gain suffices given exposures with a low radiation dose.

The layer potential can be varied in a simple way by varying the high-voltage that is applied to the electrode layer, controlled by the aforementioned control device. The voltage can be varied either before or during the registration of a radiation image, by setting the free surface of the charge layer to a pre-selected potential. Additionally, the phenomenon that the potential across the charge layer is somewhat reduced dependent on the of induced charge carriers can be used to advantage, so that a gain reduction arises by itself during the exposure, even though it is slight. Since the curve of this gain reduction is known by virtue incident quantity of charge carriers, a linear amplitude characteristic can be determined, producing the advantage that there is hardly any over-variations; further, any variation range can be optimally scanned in view of the signal-to-noise ratio.

The amplitude of the high-voltage that is applied preferably should be continuously variable dependent on the dose of the incident radiation in order to thus be able to optimally adapt the gain to the operating mode employed.

The electrode layer can be arranged on a film-like carrier, particularly on a glass film, such as by printing, and can be composed of a of essentially parallel layer strips spaced from one another. A closed electrode layer surface, however, is also conceivable.

The read-out device can be a flat emitter device, so that an extremely low overall structure of the radiation pick-up device is achieved. The surface emitter device can have linear electron emitter cathodes having allocated horizontal and/or vertical deflection electrodes. Alternatively, the surface emitter device can have micro-structured electron emitter cathodes arranged in a matrix or an array, for example in the form of nano tubes or small emitter micro-tips.

It is expedient for the radiation pick-up device to be integrated in a flat vacuum housing wherein stabilization elements, particularly in the form of structural webs, are provided, to intercept the significant high forces that act between the large-area sides.

It is also expedient to provide at least one reset light source for the exposure of the charge layer, which should be capable of being operated in pulsed fashion via the control device. Using this reset light source and given simultaneous activation of one or more or of all electron emitters, it is possible to stabilize the free surface of the charge layer to a lower potential compared to the potential that was previously present. As a result, it is possible in a simple way to lower the sensitivity of the radiation pick-up device before the registration of radiation images having a high dose that were preceded by registrations having a low dose, wherein, thus, registration was carried out with a high gain.

Overall, the inventive system offers several advantages. First, the employment of a-Si panels provided with photodiodes having allocated switches can be foregone, since the inventive system and radiation pick-up device operate with an electron beam that scans line-by-line. This has the advantage that parasitic capacitances are minimized due to the elimination of the switch capacitances with a simultaneous increase of the fill factor and of the maximum charge that can be scanned (since the scanning electron beam allows an enhanced voltage boost of the pixels). The avoidance of the photodiodes, further, is advantageous because a significantly more beneficial inertia behavior is established, particularly when switching between the various operating modes. The afterglow behavior of known a-Si panels is essentially defined and dominated by the inertia behavior of the a-Si photodiodes, which are no longer present in the inventive system.

The employment, in particular, of micro-structured flat emitter cathodes also leads to lower acquisition costs and devices having a longer service life. The greater range of dynamics established due to the possibility of varying the gain also allows employment in multi-line computed tomography detectors as well as in x-ray photon-counting detectors.

DESCRIPTION OF THE DRAWINGS

FIG. 1 is a schematic illustration of an inventive radiation image pick-up system having a radiation pick-up device shown in an exploded view.

FIG. 2 is an enlarged illustration of the region 11 from FIG. 1.

FIG. 3 is a schematic illustration of a micro-structured electron emitter cathode.

DESCRIPTION OF THE PREFERRED EMBODIMENTS

Figure 4:
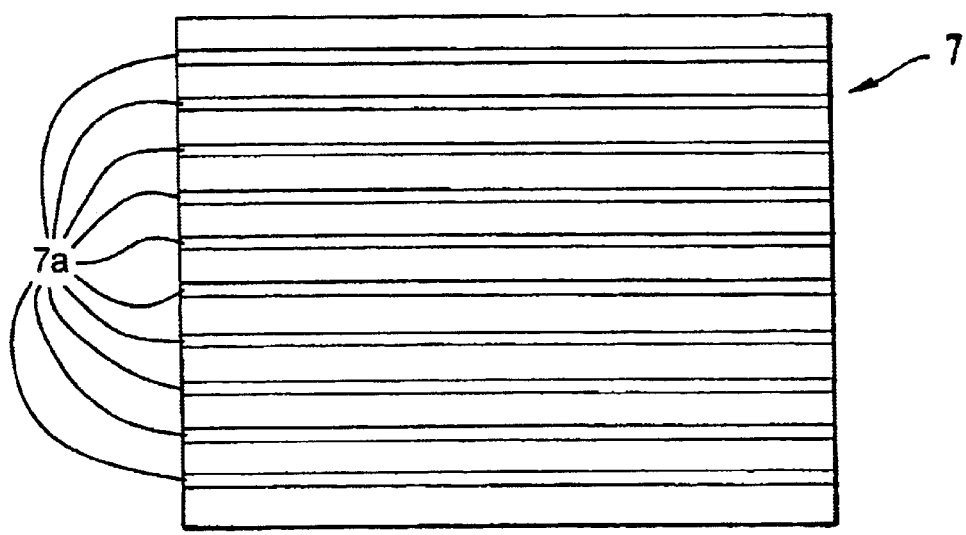
FIG. 4 is a plan view of the back of a substrate used in the inventive radiation image pick-up system, showing an embodiment wherein the electrode layer is formed by a number of stripes on the substrate.

FIG. 1 shows an inventive system 1 composed of a radiation pick-up device 2 and a control device 3 that controls the operation thereof. The radiation pick-up device 2 is arranged in a housing 4 (which is not shown in detail). Since the sides of the housing 4 are relatively large in area, they can be provided with stabilization elements 4a, to assist in withstanding the high forces acting on the walls of the housing 4. The device 2 has a substrate 5 at the beam entry side identified with the arrow, for example in the form of a glass carrier, on which a scintillator layer 6 is applied, for example, in the form of CsI needles. This is followed by a conductive electrode layer 7 of, for example, ITO (indium tin oxide) or $S_nO_2$. This electrode layer 7 should be as thin as possible (in the range of a few 100 Å) in order to avoid stray effects. A charge layer 8, preferably of amorphous silicon, is applied on this electrode layer 7. X-ray quanta incident thereon initially penetrate through the substrate 5 and subsequently penetrate into the scintillator 6 wherein conversion into visible light occurs. This light subsequently penetrates the extremely thin electrode layer and is incident on the charge layer 8. Dependent on the intensity of the penetrating light, charges are generated in the charge layer 8.

These charges are read out by an electron beam with a following read-out device. This read-out device has a cooperating cathode 9 followed by a of linear cathodes 10 which can, for example, be coated tungsten wires. These linear cathodes 10 serve as electron beam sources. Further, vertically converging electrodes 11, 12 are provided, as are vertically deflecting electrodes 13. Further, an electron beam control electrode 14 as well as a horizontally converging electrode 15 and a horizontally deflecting electrode 16 are provided. The read-out device also has an electrode 17 that accelerates the electron beam, and a retarding electrode 18.

In the illustrated example, the linear cathodes 10 extend horizontally and enable the generation of an electron beam having a linear horizontal expanse. Of course, more than the four electrodes 10 that are shown can be provided, dependent on the size of the panel. The cooperating electrodes 9 serve the purpose of generating a potential gradient with the vertically converging electrodes 11 in order to prevent the generation of electron beams from cathodes 10 other than the cathode driven for the emission of the electron beam.

Each vertically converging electrode 11 and 12 is plate-shaped and has a of oblong slots 19, each slot lying opposite a linear cathode 10. Each of the electron beams emitted by the cathodes 10 passes through a slot 19, causing the beam to converge vertically.

The vertically deflecting electrodes 13 are allocated to the respective slots 19 and are composed of upper and lower conductor 20 between which an insulator 21 is provided. When a voltage is applied between two conductors 20 lying opposite one another in two different electrodes 13, then an electron beam that passes therethrough is deflected.

The electron beam control electrode 14 is composed of a number of individual electrodes that each have an oblong slot 22. An electron beam can pass only through the slot of a correspondingly driven electron beam control electrode. An electron beam that passes through is employed for reading out the signals of a number of horizontally arranged pixels, for example ten pixels, i.e. distributions of electrical potential on the charge layer 8. After the ten pixels adjacent to this currently driven electrode are read out, then the electron beam control electrode skips ahead to the next driven electrode.

The horizontally converging electrode 15 is likewise plate-shaped and has a number of individual slots 23 that are respectively positioned opposite the slots 22. This electrode 15 causes the electron beam to be contracted horizontally to form a thin ray corresponding to the size of a pixel or to a distribution of potential.

The horizontally deflecting electrode 16 also has the shape of a conductive plate that is composed of individual plate segments. When a voltage is applied between two neighboring plate segments, then the electron beam can be horizontally deflected, and the allocated pixels or distributions of potential, for example ten pixels, are horizontally scanned.

The acceleration electrodes 17 also are plate-shaped here and serve the purpose of accelerating the electron beam. The retarding electrode 18 has the shape of a grid conductor with numerous grid openings and serves the purpose of retarding the electron beam immediately before the charge layer 8 and of guiding the electron beam such that it strikes the charge layer at the correct angle.

As shown, a high-voltage V is applied to the electrode layer 7, the amplitude thereof being controlled via the control device 3. As a result, a high-voltage is also present across the charge layer 8. This induces an avalanche effect in the charge layer 8, dependent on the amplitude of the high-voltage that is applied as well as on the number of electrons that are generated in the quanta-to-photon. By variation of the high-voltage V, the gain via the charge layer 8 can be set, so that switching can be carried out in a simple way between different operating modes that need different gains. This can ensue very quickly, particularly by using reset light 24 serving the purpose of exposing the charge layer 8. This reset light 24 can be operated, for example, in a pulsed manner by the control device 3 and causes the potential at the free surface of the charge layer 8 to be stabilized. The reset light 24 is mainly utilized for stabilizing the potential and thus for setting a desired potential when the following image exposure was previously preceded by an image exposure having low radiation dose, and thus a high gain.

FIG. 2 shows the enlarged excerpt II from FIG. 1 in the form of a schematic diagram, showing the substrate 15, for example in the form of a glass plate, onto which the scintillator 6 is applied. An intermediate carrier 25 is in turn applied on the scintillator 6, for example in the form of the glass plate. An intermediate carrier 25, for example in the form of a glass film, is in turn applied thereon, the electrode layer 7, preferably being printed on the intermediate carrier 25, for in the form of the ITO electrode. The electrode layer 7 can be composed of a number of parallel, preferably vertically arranged, electrode stripes 7a (see FIG. 4). Finally, the charge layer 8 is applied onto the electrode layer 7. As shown, the high-voltage V is applied to the electrode layer 7.

FIG. 3 is a schematic diagram of a second embodiment of an inventive system 26. The structure at the beam entry side (substrate, scintillator, electrode layer, charge layer) is the same as in the previously described embodiment, however, a different readout device is employed in the embodiment of FIG. 3. In this read-out device, a micro-structured electron emitter cathode 27 is provided as a flat emitter device, this being shown in the form of a schematic diagram. Any micro-structured emitter cathode that allows a targeted, punctiform emission of the electrons can be utilized, for example in the form of nano-tubes or micro-tips. Here, as well, the emitted electron beam is shaped by corresponding electrodes (not shown) and strikes the charge layer for the readout, a potential due to the high-voltage V at the electrode layer also being present across the charge layer.

Although modifications and changes may be suggested by those skilled in the art, it is the intention of the inventor to embody within the patent warranted hereon all changes and modifications as reasonably and properly come within the scope of his contribution to the art.

I claim as my invention:

1. A system for registering a radiation image, comprising:
   a radiation pick-up device comprising a charge layer wherein electrical charges are generated dependent on radiation incident on said charge layer, an electrode layer allocated to said charge layer that is chargeable with high-voltage for triggering an electron-multiplying avalanche effect in said charge layer by producing a potential across said charge layer resulting from said high voltage, and a read-out device for reading out charges generated in said charge layer using an electron beam;
   a reset light source positioned for exposing said charge layer to reset said charge layer to a selected charge level; and
   a control device connected to said radiation pick-up device, said high voltage being supplied to said electrode layer by said control unit and said control unit varying said high voltage to vary a gain of said charge layer caused by said avalanche effect.

2. A system as claimed in claim 1 wherein said control unit varies said high voltage while radiation is incident on said charge layer.

3. A system as claimed in claim 2 wherein said control unit varies an amplitude of said high voltage dependent on a dose of said radiation incident on said charge layer.

4. A system as claimed in claim 1 wherein said electrode layer comprises a film disposed on a carrier.

5. A system as claimed in claim 4 wherein said carrier is comprised of glass.

6. A system as claimed in claim 4 wherein said electrode layer is printed on said carrier.

7. A system as claimed in claim 4 wherein said electrode layer comprises a plurality of substantially parallel layer strips spaced from each other.

8. A system as claimed in claim 1 wherein said read-out device is a flat emitter device.

9. A system as claimed in claim 8 wherein said flat emitter device comprises a plurality of electron emitter cathodes having deflection electrodes respectively allocated thereto.

10. A system as claimed in claim 8 wherein said flat emitter device comprises micro-structured electron emitter cathodes.

11. A system as claimed in claim 10 wherein said micro-structured electron emitter cathodes are arranged in a matrix.

12. A system as claimed in claim 10 wherein said micro-structured electron emitter cathodes are arranged in an array.

13. A system as claimed in claim 8 comprising a vacuum housing with flat housing walls in which said radiation pick-up device is disposed, said housing walls having stabilization elements thereon.

14. A system as claimed in claim 13 wherein said stabilization elements comprise structural webs.

15. A system as claimed in claim 1 wherein said reset light source is connected to and is controlled by said control device.

16. A system as claimed in claim 15 wherein said control device operates said reset light source in a pulsed manner.

* * * * *